(12) United States Patent
Suzuki et al.

(10) Patent No.: US 7,249,194 B2
(45) Date of Patent: Jul. 24, 2007

(54) GATEWAY APPARATUS AND ITS CONTROLLING METHOD

(75) Inventors: Hiroki Suzuki, Katsushika-ku (JP); Yukikuni Nishida, Yokosuka (JP); Tsunemasa Hayashi, Atsugi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 912 days.

(21) Appl. No.: 10/359,537

(22) Filed: Feb. 7, 2003

(65) Prior Publication Data

US 2003/0154297 A1    Aug. 14, 2003

(30) Foreign Application Priority Data

Feb. 8, 2002   (JP) .............................. 2002-032813

(51) Int. Cl.
*G06F 15/173* (2006.01)
*G06F 15/16* (2006.01)
*H04L 12/28* (2006.01)

(52) U.S. Cl. ................ 709/238; 709/236; 709/227; 370/351

(58) Field of Classification Search ................ 709/229, 709/236, 238, 227; 370/351, 392
See application file for complete search history.

(56) References Cited

U.S. PATENT DOCUMENTS

2002/0178398 A1* 11/2002 Sekiguchi ...................... 714/4
2004/0264505 A1* 12/2004 Miki et al. .................. 370/469

FOREIGN PATENT DOCUMENTS

JP    2001237898    8/2001

* cited by examiner

*Primary Examiner*—Jason Cardone
*Assistant Examiner*—Tanim Hossain
(74) *Attorney, Agent, or Firm*—Stevens, Davis, Miller & Mosher, LLP

(57) ABSTRACT

IPoE/PPPoE forwarding table 106 is provided with which registered are network addresses, protocol types, destination IP addresses used in IPoE and retrieval indexes of PPPoE sessions used in PPPoE, a protocol type is selected corresponding to a network address in IPoE/PPPoE forwarding table 106 that matches a destination IP address included in header information of an IP packet of an input frame, and when the selected protocol type is PPPoE, a PPPoE session is further selected from a retrieval index corresponding to the network address.

6 Claims, 18 Drawing Sheets

IPoE FORWARDING TABLE

| NETWORK ADDRESS | OUTPUT IF NUMBER | TYPE OF ROUTING (DIRECT/INDIRECT ROUTING) | DESTINATION IP ADDRESS IN INDIRECT ROUTING (NEXT HOP IP ADDRESS) |
|---|---|---|---|
| 192.168.1.0/24 | 0 (LAN (TERMINAL) SIDE) | DIRECT ROUTING | |
| 0.0.0.0/0 | 1 (WAN (NETWORK) SIDE) | INDIRECT ROUTING | 192.170.1.1 |
| | | | |

FIG. 3

ARP TABLE

| DESTINATION IP ADDRESS | SOURCE MAC ADDRESS | DESTINATION MAC ADDRESS |
|---|---|---|
| 192.170.1.1 | AA.AA.AA.AA.AA.AA | AB.AA.AA.AA.AA.AA |
| 192.168.1.1 | AA.AA.AA.AA.AA.AA | BB.BB.BB.BB.BB.BC |
| | | |

FIG. 4

PPPoE FORWARDING TABLE

| SOURCE IP ADDRESS | OUTPUT IF NUMBER | RETRIEVAL INDEX PPPoE SESSION |
|---|---|---|
| 192.168.1.1 | 1 | 1 |
| 192.170.1.1 | 1 | 2 |
| 192.172.1.1 | 1 | 3 |

FIG. 7

PPPoE SESSION TABLE

| RETRIEVAL INDEX OF PPPoE SESSION | CLIENT MAC ADDRESS | SERVER MAC ADDRESS | PPPoE SESSION ID |
|---|---|---|---|
| 1 | AA.AA.AA.AA.AA.AA | CC.CC.CC.CC.CC.CC | 20 |
| 2 | AA.AA.AA.AA.AA.AA | BB.BB.BB.BB.BB.BB | 30 |
| 3 | AA.AA.AA.AA.AA.AA | DD.DD.DD.DD.DD.DD | 32 |

FIG. 8

IPoE/PPPoE FORWARDING TABLE

| NETWORK ADDRESS | OUTPUT IF NUMBER | TYPE OF ROUTING (DIRECT/INDIRECT ROUTING) | DESTINATION IP ADDRESS IN INDIRECT ROUTING (NEXT HOP IP ADDRESS) | OUTPUT PROTOCOL (LAYER 2 PROTOCOL) | RETRIEVAL INDEX OF PPPoE SESSION |
|---|---|---|---|---|---|
| 12.10.10.0/24 | 1 | INDIRECT ROUTING | 192.170.1.1 | IPoE | — |
| 13.10.10.0/24 | 1 | — | — | PPPoE | 1 |
| 0.0.0.0/0 | 1 | — | — | PPPoE | 2 |

FIG. 11

DEFAULT ROUTE TABLE

| SOURCE IP ADDRESS | OUTPUT IF NUMBER | TYPE OF ROUTING (DIRECT/INDIRECT ROUTING) | DESTINATION IP ADDRESS IN INDIRECT ROUTING (NEXT HOP IP ADDRESS) | OUTPUT PROTOCOL (LAYER 2 PROTOCOL) | RETRIEVAL INDEX OF PPPoE SESSION |
|---|---|---|---|---|---|
| 192.168.1.1 | 1 | — | — | PPPoE | 3 |
| 192.172.1.1 | 1 | — | — | PPPoE | 2 |
| | | | | | |

FIG. 12

PPPoE PROXY TABLE

| INPUT IF NUMBER | SOURCE MAC ADDRESS ① | DESTINATION MAC ADDRESS ① | PPPoE SESSION ID ① | OUTPUT IF NUMBER | SOURCE MAC ADDRESS ② | DESTINATION MAC ADDRESS ② | PPPoE SESSION ID ② |
|---|---|---|---|---|---|---|---|
| 0 | BB.BB.BB.BB.BB.BB | AA.AA.AA.AA.AA.AA | 2 | 1 | AA.AA.AA.AA.AA.AA | EE.EE.EE.EE.EE.EE | 3 |
| 0 | CC.CC.CC.CC.CC.CC | AA.AA.AA.AA.AA.AA | 1 | 1 | AA.AA.AA.AA.AA.AA | DD.DD.DD.DD.DD.DD | 2 |
| 0 | BB.BB.BB.BB.BB.BA | AA.AA.AA.AA.AA.AA | 2 | 1 | AA.AA.AA.AA.AA.AA | EE.EE.EE.EE.EE.EE | 3 |
| | | | | | | | |

FIG. 15

ADDRESS CONVERSION TABLE

| LOCAL_IP ADDRESS | LOCAL_PORT NUMBER | GLOBAL_IP ADDRESS | GLOBAL_PORT NUMBER |
|---|---|---|---|
| 192.168.1.1 | 70 | 192.170.1.2 | 70 |
| 192.172.1.1 | 70 | 192.180.1.2 | 70 |
| 192.174.1.1 | 70 | 192.190.1.2 | 70 |
| | | | |

FIG. 18

GATEWAY APPARATUS AND ITS CONTROLLING METHOD

BACKGROUND OF THE INVENTION

1. Field of the Invention

The present invention relates to a gateway apparatus that supports PPPoE (Point to Point Protocol over Ethernet(R)) and a method of controlling such an apparatus.

2. Description of the Related Art

Conventionally, a gateway apparatus is used so as to implement mutual communications between networks constructed in a corporation and external networks. For example, the gateway apparatus is used as a protocol converter for mutually connecting networks with different protocols. Examples of configuration of the gateway apparatus is one that supports only IPoE (Internet Protocol over Ethernet(R)) as a protocol for external networks, and one that supports both IPoE and PPPoE as protocols for external networks.

FIG. 1 illustrates a configuration of gateway apparatus 1100 that supports only IPoE. FIG. 2 is a diagram illustrating an example of network configuration to which gateway apparatus 1100 that supports only IPoE is connected.

As shown in FIG. 2, gateway apparatus 1100 is connected in its one interface to networks 1201 to 1204 that use IPoE as a protocol. Gateway apparatus 1100 communicates with gateways 1205 to 1208 disposed respectively on networks 1201 to 1204. Gateway apparatus 1100 is further connected in its other interface to terminals 1209 to 1211 such as personal computers (hereinafter referred to as "PC") that use IPoE as a protocol.

In gateway apparatus 1100 shown in FIG. 1, frame transmitting/receiving sections 1101 and 1102 transmit/receive frames to/from Ethernet (R) I/F. IPoE frame assembling/deassembling sections 1103 and 1104 assemble and deassemble IPoE frames, while recognizing the IPoE frame structure.

Forwarding control section 1105 controls the output of IPoE frame based on a destination IP address included in the header information of an IP packet of an input IPoE frame. In controlling the output of IPoE frame, forwarding control section 1105 uses IPoE forwarding table 1106 and ARP (Address Resolution Protocol) table 1107.

As shown in FIG. 3, with IPoE forwarding table 1106 are registered network addresses, output interface numbers (output IF numbers), types of routing (direct/indirect routing) and destination IP addresses (next hop IP addresses) in indirect routing in relation to one another.

As shown in FIG. 4, with ARP table 1107 are registered destination IP addresses, source MAC addresses and destination MAC addresses in relation to one another. In addition, in source MAC address, since the MAC address of gateway apparatus 1100 is generally used, all the entries have the same value. Accordingly, it may be possible to provide the MAC address of gateway apparatus 1100 as a separate register, instead of providing areas for source MAC addresses in ARP table 1107.

The operation of gateway apparatus 1100 will be described below which has the aforementioned configuration and supports only IPoE. Herein, the case is explained where an IPoE frame is input to frame transmitting/receiving section 1101.

When an IPoE frame is input to frame transmitting/receiving section 1101, IPoE frame assembling/deassembling section 1103 recognizes a structure of the IPoE frame, and provides the recognized structure of the IPoE frame to forwarding control section 1105.

Forwarding control section 1105 compares a destination IP address included in the header information of an IP packet of the IPoE frame with a network address registered with IPoE forwarding table 1106.

When the table 1106 has the same network address as the destination IP address, the section 1105 acquires an output IF number and information of routing type (information indicative of whether the routing is direct routing or indirect routing) in relation to the network address in IPoE forwarding table 1106, and when the indirect routing is indicated, further acquires a destination IP address (next hop IP address). In addition, when the direct routing is indicated, the section 1105 acquires the destination IP address of the IP header of the IP packet.

Then, forwarding control section 1105 searches ARP table 1107 using the retrieved destination IP address to retrieve a source MAC address and destination MAC address of the IPoE frame. The retrieved source MAC address and destination MAC address are provided to IPoE frame assembling/deassembling section 1104.

Using the source MAC address and destination MAC address, IPoE frame assembling/deassembling section 1104 re-assembles the IPoE frame. There-assembled IPoE frame is provided to frame transmitting/receiving section 1102 and output from the section 1102. In this way, IPoE frames are forwarded in gateway apparatus 1100 that supports only IPoE.

FIG. 5 is a diagram illustrating a configuration of gateway apparatus 1500 that supports PPPoE. In addition, in FIG. 5 sections assigned the same reference numerals as in FIG. 1 have the same functions and descriptions thereof are omitted. FIG. 6 is a diagram illustrating an example of network configuration to which gateway apparatus 1500 that supports PPPoE is connected.

As shown in FIG. 6, gateway apparatus 1500 is connected in its one interface to network 1601 using IPoE as a protocol and networks 1602 to 1604 using PPPoE as a protocol. Gateway apparatus 1500 communicates with gateway 1605 disposed on network 1601 and PPPoE servers 1606 to 1608 disposed respectively on networks 1602 to 1604. Gateway apparatus 1500 is further connected in its other interface to terminals 1609 to 1611 such as personal computers that use IPoE as a protocol.

In gateway apparatus 1500 shown in FIG. 5, IPoE/PPPoE frame assembling/deassembling sections 1501 and 1502 assemble and deassemble IPoE frames and PPPoE frames, while recognizing the IPoE frame structure and PPPoE frame structure.

Forwarding control section 1503 controls the output of IPoE or PPPoE frame based on a source IP address or destination IP address included in the header information of an IP packet of an input IPoE frame, while controlling the output of PPPoE frame based on PPPoE header information of an input PPPoE frame. In controlling the output of IPoE or PPPoE frame, forwarding control section 1503 uses PPPoE forwarding table 1504 and PPPoE session table 1505 in addition to IPoE forwarding table 1106 and ARP table 1107.

As shown in FIG. 7, PPPoE forwarding table 1504 has source IP addresses, output IF numbers and retrieval indexes of PPPoE session (hereinafter referred to as "PPPoE session indexes") in relation to one another.

As shown in FIG. 8, PPPoE session table 1505 has PPPoE session indexes, client MAC addresses, server MAC addresses and PPPoE session IDs in relation to one another.

The operation of gateway apparatus 1500 will be described below which has the aforementioned configuration and supports PPPoE. Herein, cases are explained separately where an IPoE frame is input to frame transmitting/receiving section 1101 and where a PPPoE frame is input to the section 1101.

When either frame is input to frame transmitting/receiving section 1101, IPoE/PPPoE frame assembling/deassembling section 1501 recognizes a structure of the frame, and provides the recognized structure of the frame to forwarding control section 1503.

When the input frame is an IPoE frame, forwarding control section 1503 compares a source IP address included in the header information of an IP packet of the IPoE frame with a source IP address registered with PPPoE forwarding table 1504.

When the table 1504 has the same source IP address as the source IP address included in the header information of the IP packet of the IPoE frame, the section 1503 acquires an output IF number and PPPoE session index in relation to the source IP address in PPPoE forwarding table 1504.

Then, forwarding control section 1503 searches PPPoE session table 1505 using the retrieved PPPoE session index, and acquires information such as a source MAC address, destination MAC address and PPPoE session ID to generate a PPPoE frame. The retrieved information to generate the PPPoE frame is provided to IPoE/PPPoE frame assembling/deassembling section 1502.

In addition, there is no direction information of source MAC address and destination MAC address in PPPoE session table 1505. The client MAC address is acquired as the source MAC address, and the server MAC address is acquired as the destination MAC address.

Based on the information to generate the PPPoE frame, IPoE/PPPoE frame assembling/deassembling section 1502 re-assembles the input IPoE frame to a PPPoE frame. The re-assembled PPPoE frame is provided to frame transmitting/receiving section 1102 and output from the section 1102.

When the same source IP address as that included in the header information of the IP packet of the IPoE frame is not registered with PPPoE forwarding table 1504, forwarding control section 1503 compares a destination IP address included in the header information of the IP packet with a network address registered with IPoE forwarding table 1106.

When the table 1106 has the same network address as the destination IP address, the section 1105 retrieves an output IF number and information of routing type (information indicative of whether the routing is direct routing or indirect routing) in relation to the network address in IPoE forwarding table 1106, and when the indirect routing is indicated, further retrieves a destination IP address (next hop IP address). In addition, when the direct routing is indicated, the section 1105 retrieves the destination IP address of the IP header of the IP packet.

Then, forwarding control section 1503 searches ARP table 1107 using the retrieved destination IP address to retrieve a source MAC address and destination MAC address of the IPoE frame. The retrieved source MAC address and destination MAC address are provided to IPoE/PPPoE frame assembling/deassembling section 1502.

Using the source MAC address and destination MAC address, IPoE/PPPoE frame assembling/deassembling section 1502 re-assembles the IPoE frame. The re-assembled IPoE frame is provided to frame transmitting/receiving section 1102 and output from the section 1102.

Meanwhile, when the input frame is a PPPoE frame, forwarding control section 1503 compares PPPoE header information of the PPPoE frame with an entry in PPPoE session table 1505.

When PPPoE header information of the PPPoE frame is matched with an entry registered with PPPoE session table 1505, the section 1503 compares a destination IP address included in the header information of an IP packet of the PPPoE frame with a network address registered with IPoE forwarding table 1106.

When the table 1106 has the same network address as the destination IP address, the section 1503 retrieves an output IF number and information of routing type (information indicative of whether the routing is direct routing or indirect routing) in relation to the network address, and when the indirect routing is indicated, further retrieves a destination IP address (next hop IP address). In addition, when the direct routing is indicated, the section 1503 retrieves the destination IP address of the IP header of the IP packet.

Then, forwarding control section 1503 searches ARP table 1107 using the retrieved destination IP address to retrieve a source MAC address and destination MAC address. The retrieved source MAC address and destination MAC address are provided to IPoE/PPPoE frame assembling/deassembling section 1502.

Using the source MAC address and destination MAC address, IPoE/PPPoE frame assembling/deassembling section 1502 re-assembles the PPPoE frame to an IPoE frame. The re-assembled IPoE frame is provided to frame transmitting/receiving section 1102 and output from the section 1102.

Thus, gateway apparatus 1500 that supports PPPoE relays an IPoE frame as an IPoE address according to a network address corresponding to a destination IP address included in the header information of an IP packet of the IPoE frame, while outputting as a PPPoE frame, selecting a PPPoE session corresponding to a source IP address included in the header information of the IP packet of the IPoE frame.

However, gateway apparatus 1100 that supports only IPoE has a problem that the apparatus 1100 cannot relay frames except IPoE frames. Further, gateway apparatus 1500 that supports PPPoE selects a PPPoE session corresponding to a source IP address included in the header information of an IP packet of an input IPoE frame. Accordingly, there arises a problem that since each terminal (1609 to 1611) cannot select a plurality of PPPoE sessions concurrently, it is not possible to access a plurality of PPPoE servers. Further, there is another problem that when source IP addresses are matched, since an IPoE frame is output automatically as a PPPoE frame, it is not possible to access a network that uses IPoE.

SUMMARY OF THE INVENTION

It is an object of the present invention to provide a gateway apparatus that supports PPPoE and a method of controlling such an apparatus which enables terminals connected to the apparatus to select a protocol to use between PPPoE and IPoE and to select a plurality of PPPoE sessions concurrently.

That is, the gateway apparatus according to the present invention is provided with an IPoE/PPPoE forwarding table with which registered are network addresses, protocol types, destination IP addresses used in IPoE and retrieval indexes of PPPoE used in PPPoE, selects a protocol type corresponding to a network address in the IPoE/PPPoE forwarding table which matches a destination IP address included in the header information of an IP packet of an input frame, and when a selected protocol type is PPPoE, is capable of selecting a PPPoE session from a retrieval index corresponding to the network address.

Further, the gateway apparatus according to the present invention is provided with a PPPoE proxy table with which registered are source MAC addresses and PPPoE session IDS on input side and destination MAC addresses and PPPoE session IDs on output side, and relays an input PPPoE frame to a network that uses PPPoE as a protocol.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 3 is a table illustrating a configuration of an IPoE forwarding table provided in the conventional gateway apparatus;

FIG. 4 is a table illustrating a configuration of an ARP table provided in the conventional gateway apparatus;

FIG. 7 is a table illustrating a configuration of a PPPoE forwarding table provided in the conventional gateway apparatus;

FIG. 8 is a table illustrating a configuration of a PPPoE session table provided in the conventional gateway apparatus;

FIG. 11 is a table illustrating a configuration of an IPoE/PPPoE forwarding table provided in the gateway apparatus according to the first embodiment;

FIG. 12 is a table illustrating a configuration of a default route table provided in the gateway apparatus according to the first embodiment;

FIG. 15 is a table illustrating a configuration of a PPPoE proxy table provided in the gateway apparatus according to the second embodiment;

FIG. 18 is a table illustrating a configuration of an address conversion table provided in the gateway apparatus according to each of the first to third embodiments.

DETAILED DESCRIPTION OF THE PREFERRED EMBODIMENTS

Embodiments of the present invention will be described below specifically with reference to accompanying drawings.

First Embodiment

Figure 1:
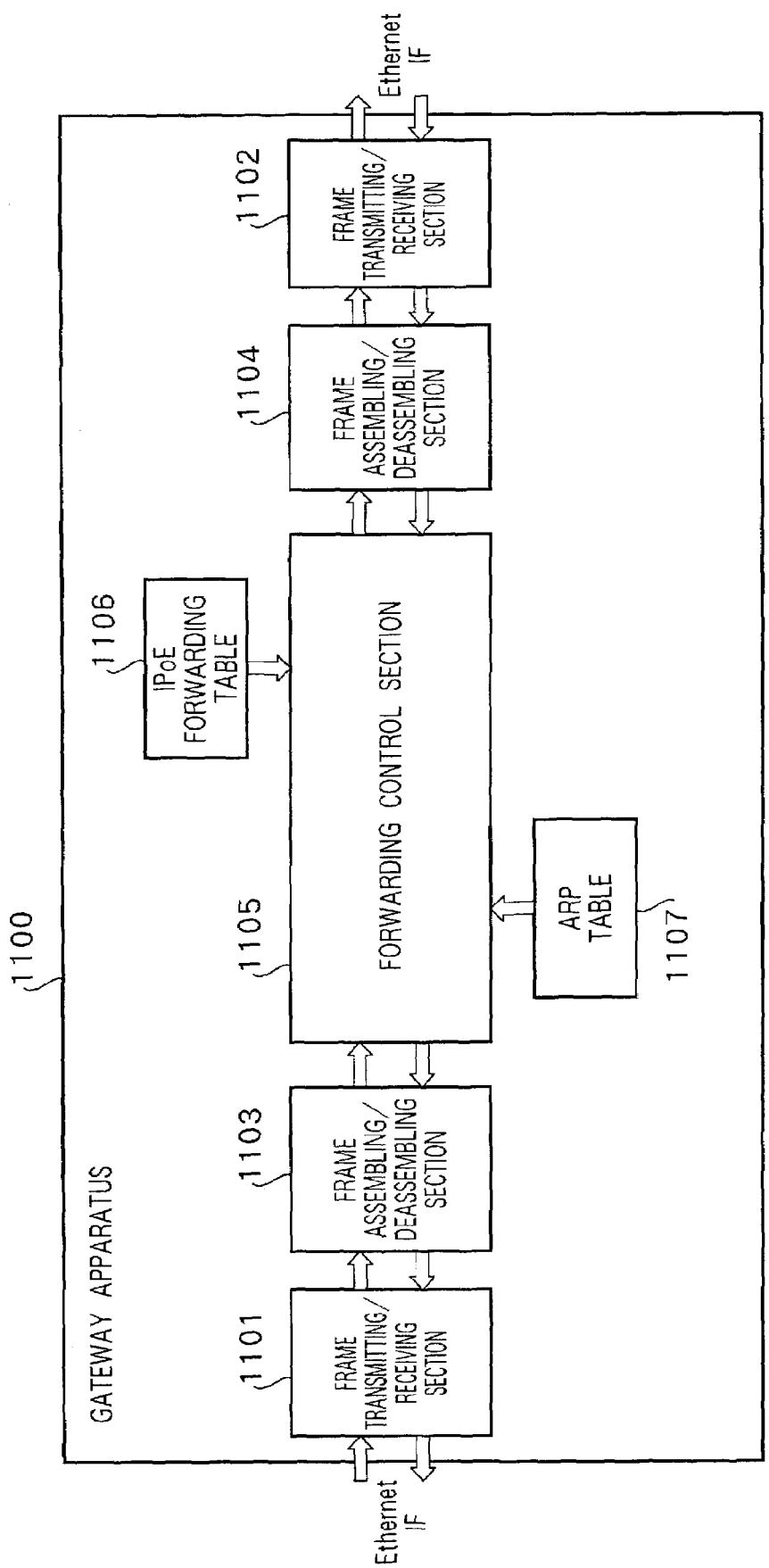
FIG. 1 is a diagram illustrating a configuration of a conventional gateway apparatus that supports only IPoE.
Figure 2:
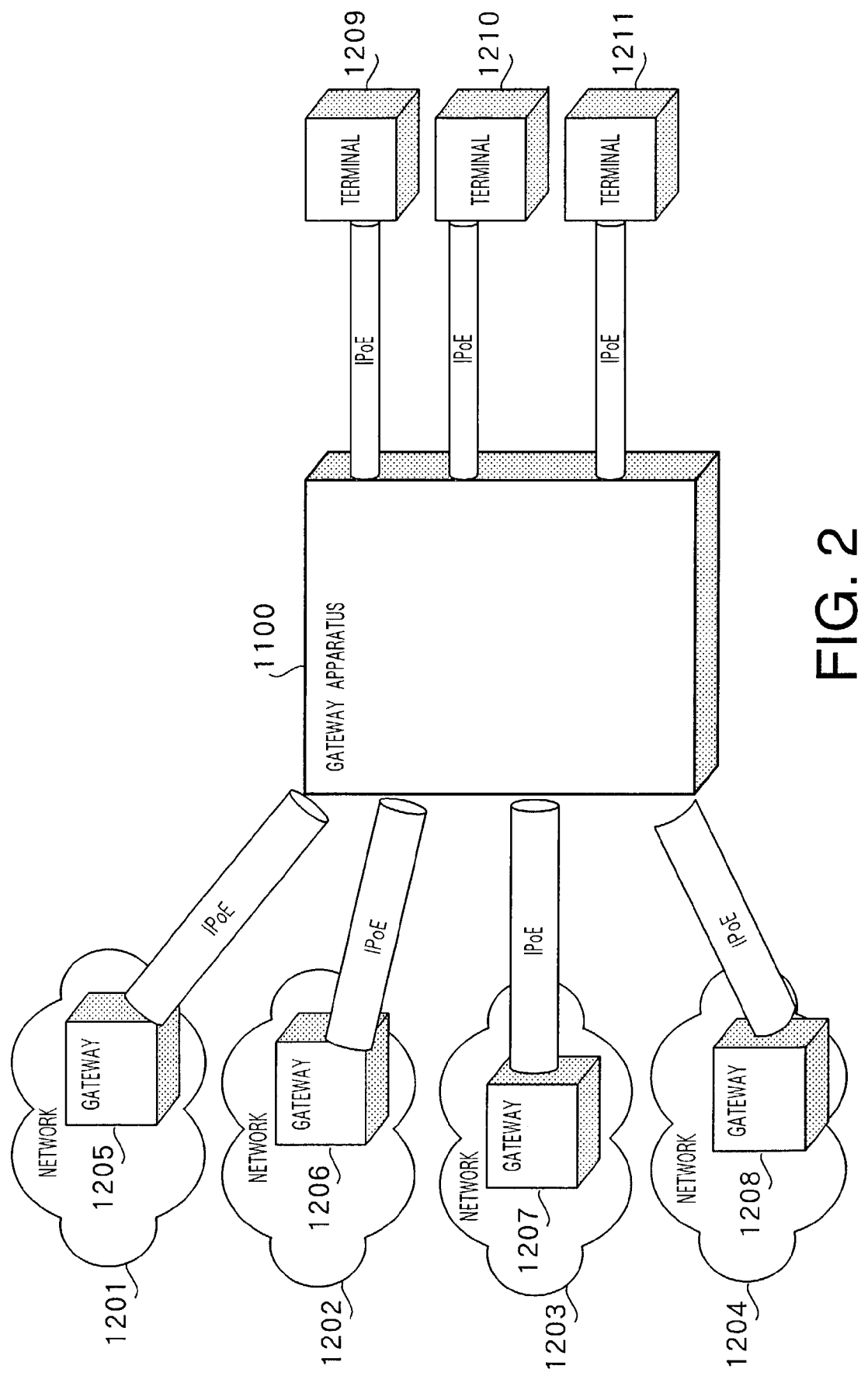
FIG. 2 is a diagram illustrating an example of network configuration to which the conventional gateway apparatus that supports only IPoE is connected.
Figure 5:
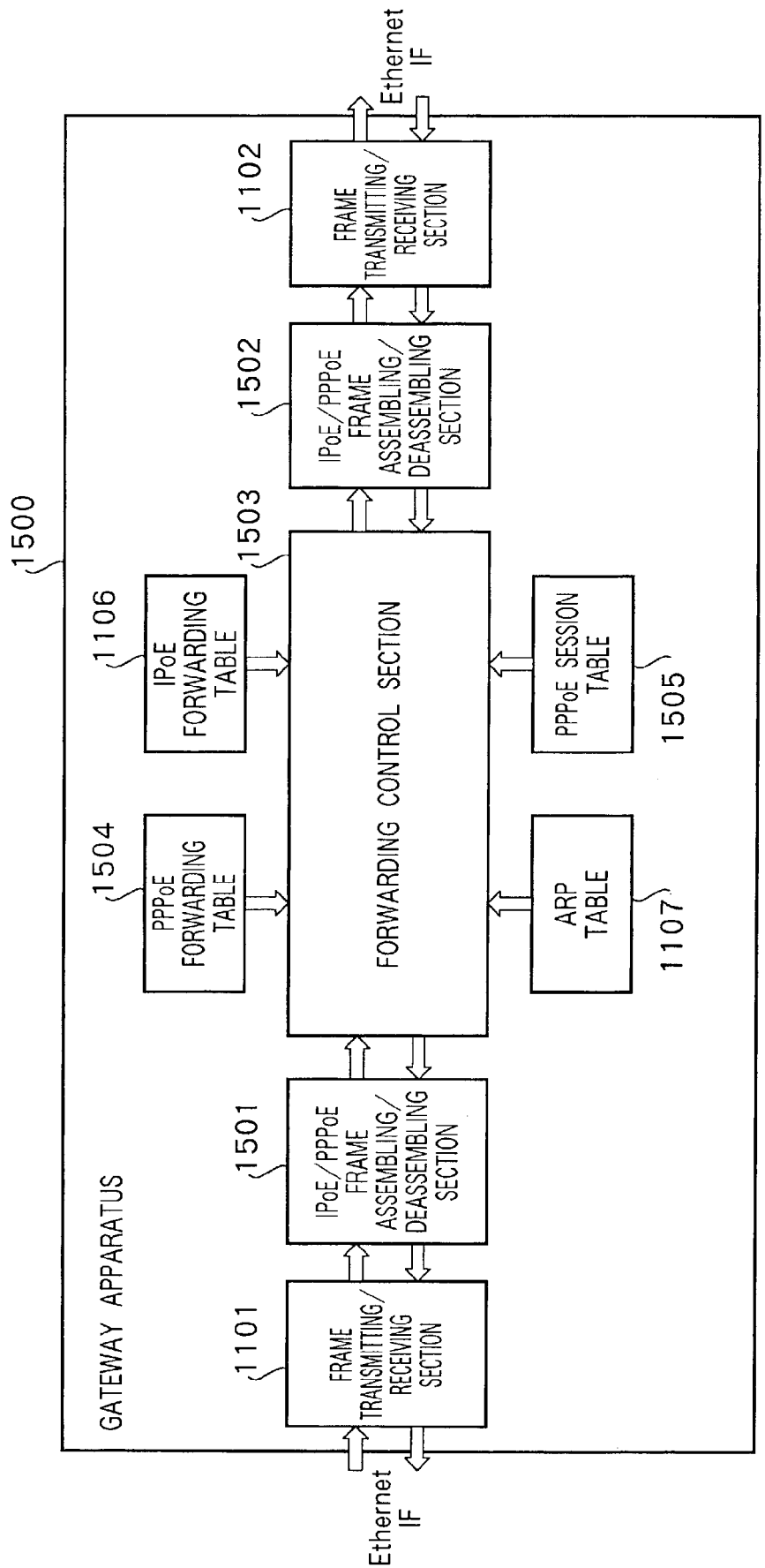
FIG. 5 is a diagram illustrating a configuration of a conventional gateway apparatus that supports PPPoE.
Figure 6:
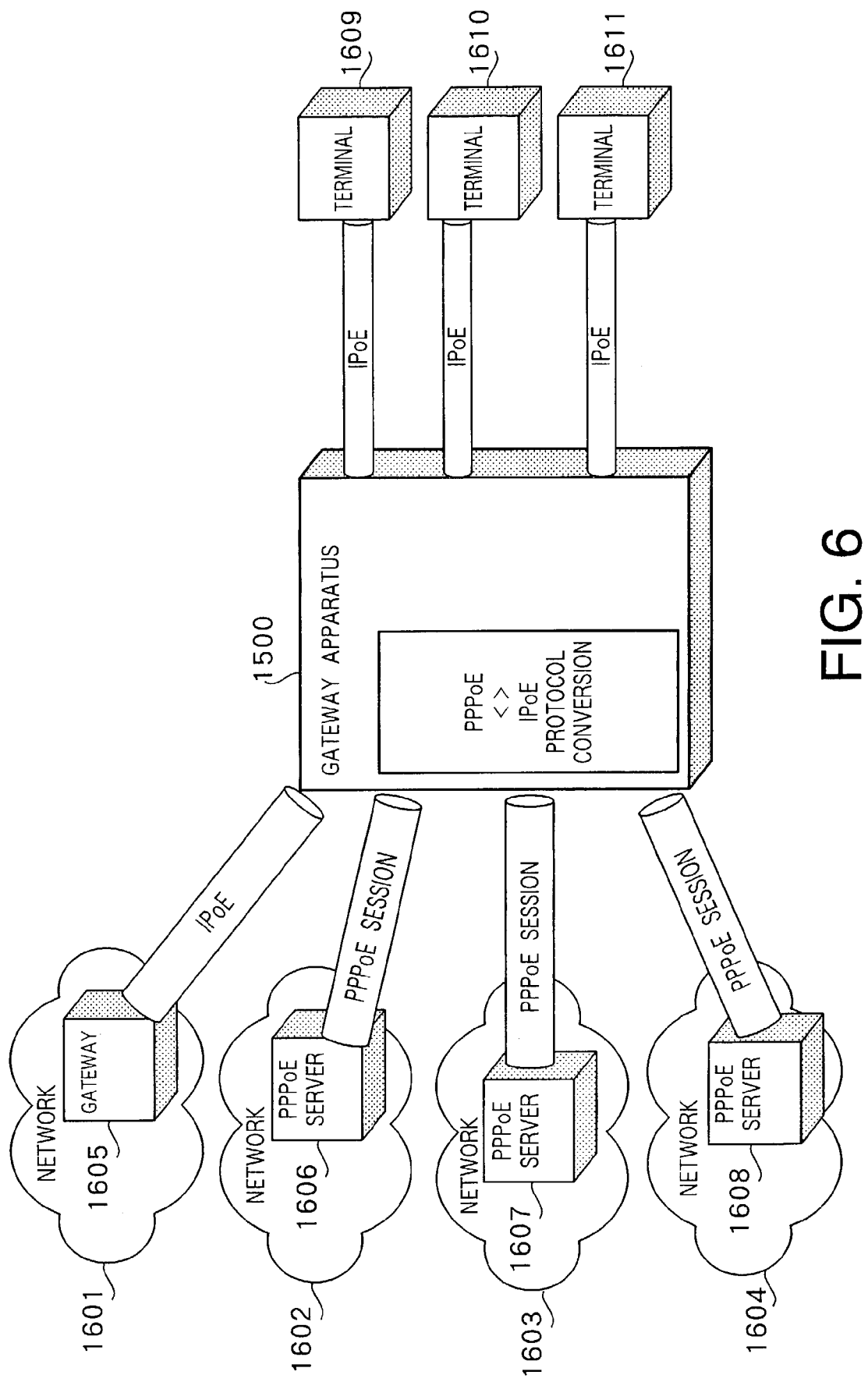
FIG. 6 is a diagram illustrating an example of network configuration to which the conventional gateway apparatus that supports PPPoE is connected.
Figure 9:
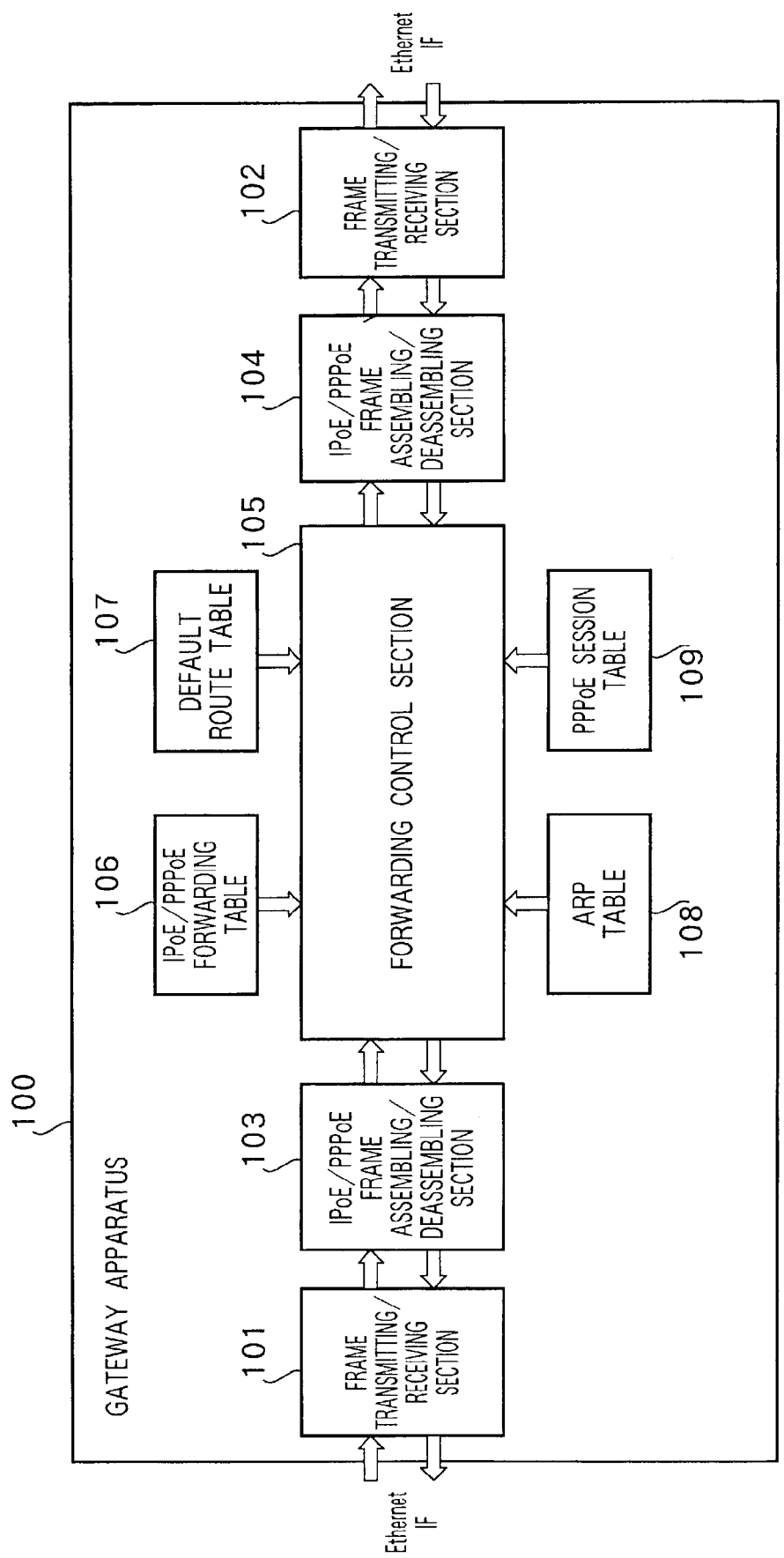
FIG. 9 is a diagram illustrating a configuration of a gateway apparatus according to a first embodiment of the present invention.
Figure 10:
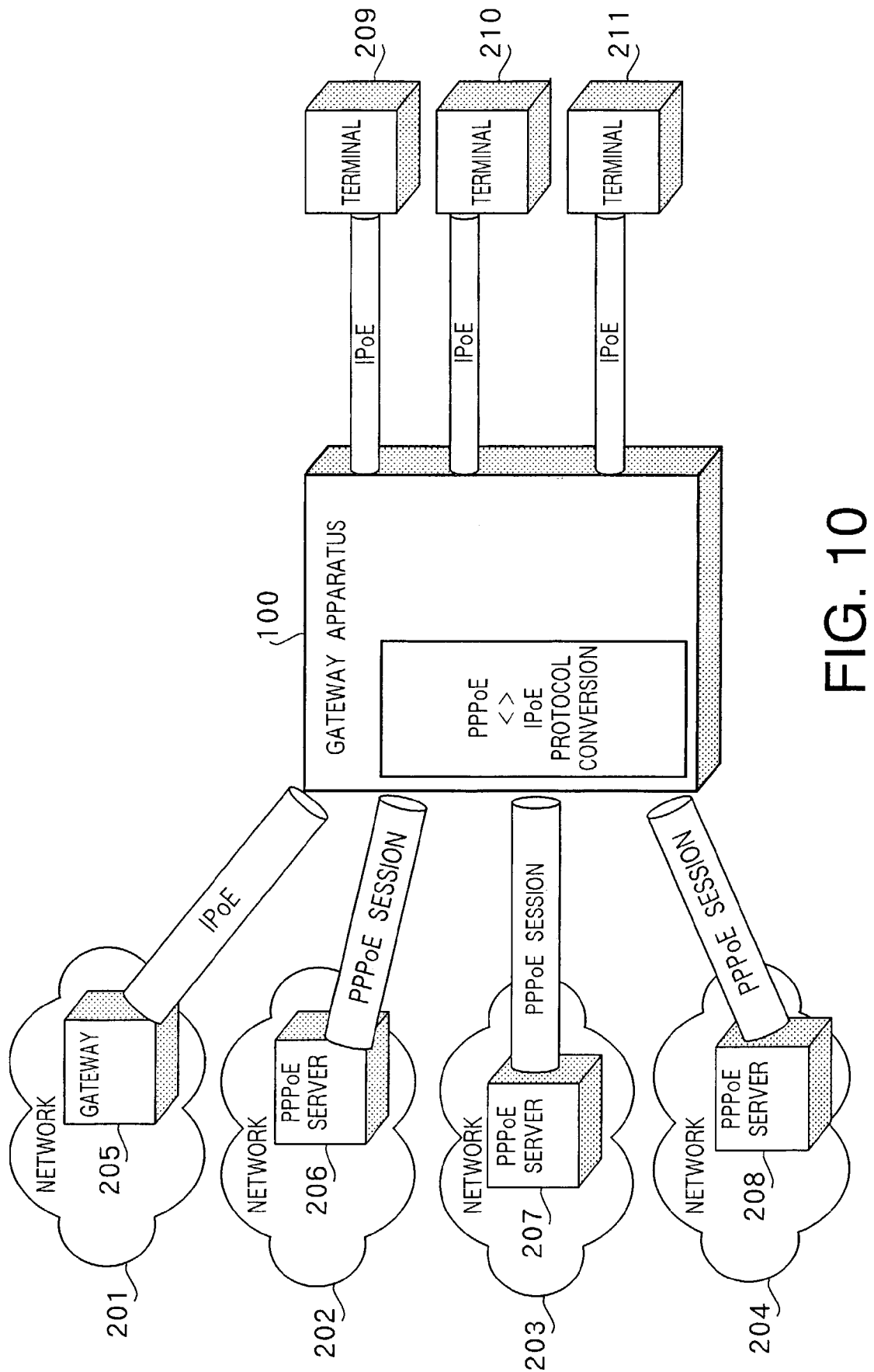
FIG. 10 is a diagram illustrating an example of network configuration to which the gateway apparatus according to the first embodiment is connected.

FIG. 9 is a diagram illustrating a configuration of gateway apparatus 100 according to the first embodiment of the present invention. FIG. 10 is a diagram illustrating an example of network configuration to which gateway apparatus 100 according to the first embodiment is connected.

As shown in FIG. 10, gateway apparatus 100 is connected in its one interface to network 201 that uses IPoE as a protocol and networks 202 to 204 that use PPPoE as a protocol. Gateway apparatus 100 communicates with gateway 205 disposed on network 201 and PPPoE servers 206 to 208 disposed respectively on networks 202 to 204. Gateway apparatus 100 is further connected in its other interface to terminals 209 to 211 such as PCs that use IPoE as a protocol.

In gateway apparatus 100 shown in FIG. 9, frame transmitting/receiving sections 101 and 102 transmit/receive frames to/from Ethernet (R) I/F. IPoE/PPPoE frame assembling/deassembling sections 103 and 104 assemble and deassemble IPoE frames and PPPoE frames, while recognizing the IPoE frame structure and PPPoE frame structure.

Forwarding control section 105 controls the output of IPoE or PPPoE frame based on a source IP address or destination IP address included in the header information of an IP packet of an input IPoE frame, while controlling the output of IPoE or PPPoE frame based on PPPoE header information of an input PPPoE frame. In controlling the output of IPoE or PPPoE frame, forwarding control section 105 uses IPoE/PPPoE forwarding table 106, default route table 107, and ARP table 108 and PPPoE session table 109.

With IPoE/PPPoE forwarding table 106 are registered the information included in the conventional IPoE forwarding table (see FIG. 3), the information included in the conventional PPPoE forwarding table (see FIG. 7) and protocols (Layer 2 protocol) used in outputting.

Specifically, as shown in FIG. 11, there are network addresses, output IF numbers, routing types (direct/indirect routing) when IPoE is selected as a protocol type, destination IP addresses (next hop IP addresses) when indirect routing is selected as a routing type in IPoE, protocol types (Layer 2 protocol) used in putting and PPPoE session indexes when PPPoE is selected as a protocol type in relation to one another.

Default route table 107 has information registered therewith where source IP addresses substitute for network addresses in IPoE/PPPoE forwarding table 106, and in this respect, differs from IPoE/PPPoE forwarding table 106.

Specifically, as shown in FIG. 12, there are source IP addresses, output IF numbers, routing types (direct/indirect routing) when IPoE is selected as a protocol type, destination IP addresses (next hop IP addresses) when indirect routing is selected as a routing type in IPoE, protocol types (Layer 2 protocol) used in outputting and PPPoE session indexes when PPPoE is selected as a protocol type in relation to one another.

In addition, ARP table 108 and PPPoE session table 109 contain respectively the same information as in FIG. 4 and FIG. 8 as described above, and descriptions there of are omitted. In source MAC addresses in ARP table 108, since the MAC address of gateway apparatus 100 is generally used, all the entries have the same value. Accordingly, it may be possible to provide the source MAC address as a separate register, instead of providing areas for source MAC addresses in ARP table 108.

The operation of gateway apparatus 100 with the above configuration will be described below. Herein, cases are explained separately where an IPoE frame is input to frame transmitting/receiving section 101 and where a PPPoE frame is input to the section 101.

When either frame is input to frame transmitting/receiving section 101, IPoE/PPPoE frame assembling/deassembling section 103 recognizes a structure of the frame, and provides the recognized structure of the frame to forwarding control section 105.

When the input frame is an IPoE frame, forwarding control section 105 compares a destination IP address included in the header information of an IP packet of the IPoE frame with a network address registered with IPoE/PPPoE forwarding table 106.

When the table 106 has the same network address as the destination IP address, the section 105 retrieves an output IF number and a protocol type (PPPoE or IPoE) used in outputting in relation to the network address. When the retrieved protocol type is IPoE, the section 105 retrieves a routing type (direct routing or indirect routing), and in the case of the indirect routing, further retrieves a destination IP address (next hop IP address). In addition, in the case of the direct routing, the section 105 retrieves the destination IP address included in the header information of the IP packet. Meanwhile, when the retrieved protocol type is PPPoE, the section 105 retrieves a PPPoE session index.

When the retrieved protocol type is IPoE, forwarding control section 105 searches ARP table 108 using the retrieved destination IP address to retrieve a destination MAC address. The retrieved destination MAC address is provided to IPoE/PPPoE frame assembling/deassembling section 104.

Using the destination MAC address, IPoE/PPPoE frame assembling/deassembling section 104 re-assembles the IPoE frame. The re-assembled IPoE frame is provided to frame transmitting/receiving section 102, and output from the section 102.

Meanwhile, when the retrieved protocol type is PPPoE, the section 105 searches PPPoE session table 109 using the PPPoE session index, and retrieves information to generate a PPPoE frame such as a source MAC address, destination MAC address and PPPoE session ID. The retrieval results are provided to IPoE/PPPoE frame assembling/deassembling section 104.

Based on the retrieval results, IPoE/PPPoE frame assembling/deassembling section 104 re-assembles the IPoE frame into a PPPoE frame. The re-assembled PPPoE frame is provided to frame transmitting/receiving section 102 and output from the section 102.

Meanwhile, when the input frame is a PPPoE frame, forwarding control section 105 compares PPPoE header information of the PPPoE frame with an entry in PPPoE session table 109.

When PPPoE header information of the PPPoE frame is matched with an entry registered with PPPoE session table 109, the section 105 compares a destination IP address included in the header information of an IP packet of the PPPoE frame with a network address registered with IPoE/PPPoE forwarding table 106.

When the table 106 has the same network address as the destination IP address included in the header information, the section 105 retrieves an output IF number and a protocol type (PPPoE or IPoE) used in outputting in relation to the network address. When the retrieved protocol type is IPoE, the section 105 retrieves a routing type (direct routing or indirect routing), and in the case of the indirect routing, further retrieves a destination IP address (next hop IP address). In addition, in the case of the direct routing, the section 105 retrieves the destination IP address included in the header information of the IP packet. Meanwhile, when the retrieved protocol type is PPPoE, the section 105 retrieves a PPPoE session index.

When the retrieved protocol type is IPoE, forwarding control section 105 searches ARP table 108 using the retrieved destination IP address to retrieve a destination MAC address. The retrieved destination MAC address is provided to IPoE/PPPoE frame assembling/deassembling section 104.

Using the destination MAC address, IPoE/PPPoE frame assembling/deassembling section 104 re-assembles the PPPoE frame to an IPoE frame. There-assembled IPoE frame is provided to frame transmitting/receiving section 102, and output from the section 102.

Meanwhile, when the retrieved protocol type is PPPoE, the section 105 searches PPPoE session table 109 using the PPPoE session index, and retrieves information to generate a PPPoE frame such as a source MAC address, destination MAC address and PPPoE session ID. The retrieval results are provided to IPoE/PPPoE frame assembling/deassembling section 104.

Based on the retrieval results, IPoE/PPPoE frame assembling/deassembling section 104 re-assembles the PPPoE frame. The re-assembled PPPoE frame is provided to frame transmitting/receiving section 102 and output from the section 102.

Thus, according to gateway apparatus 100 of first embodiment, forwarding control section 105 selects a type of protocol (IPoE or PPPoE) used in outputting corresponding to a network address in relation to a destination IP address included in the header information of an input frame, and when the type of protocol is PPPoE, further selects a PPPoE session. Accordingly, the apparatus 100 is capable of using a protocol between IPoE and PPPoE appropriately corresponding to a network as a destination of the input frame, and capable of choosing a PPPoE session appropriately when the protocol is PPPoE.

In addition, in searching IPoE/PPPoE forwarding table 106, when a network address matches a network address that is not designated particularly, i.e., an entry of default route, forwarding control section 105 searches default route table 107, using a source IP address of an IP packet.

When the same source IP address is registered, forwarding control section 105 substitutes a retrieval result of default route table 107 for a retrieval result of IPoE/PPPoE forwarding table 106 to use.

In other words, corresponding to source IP address, forwarding control section 105 selects a type of protocol (IPoE or PPPoE) used in outputting, and when the protocol type is PPPoE, further selects a PPPoE session. Accordingly, even when a general network address is not retrieved, the section 105 is capable of identifying a terminal corresponding to the source IP address, selecting a type of protocol (IPoE or PPPoE) to use for each terminal, and when the protocol type is PPPoE, further selecting a PPPoE session. Therefore, provided that a user of a terminal beforehand registers information of a desired ISP (Internet Service Provider), the apparatus is capable of using ISP appropriately for each terminal even in the case where a general network address is not retrieved.

Second Embodiment

Figure 13:
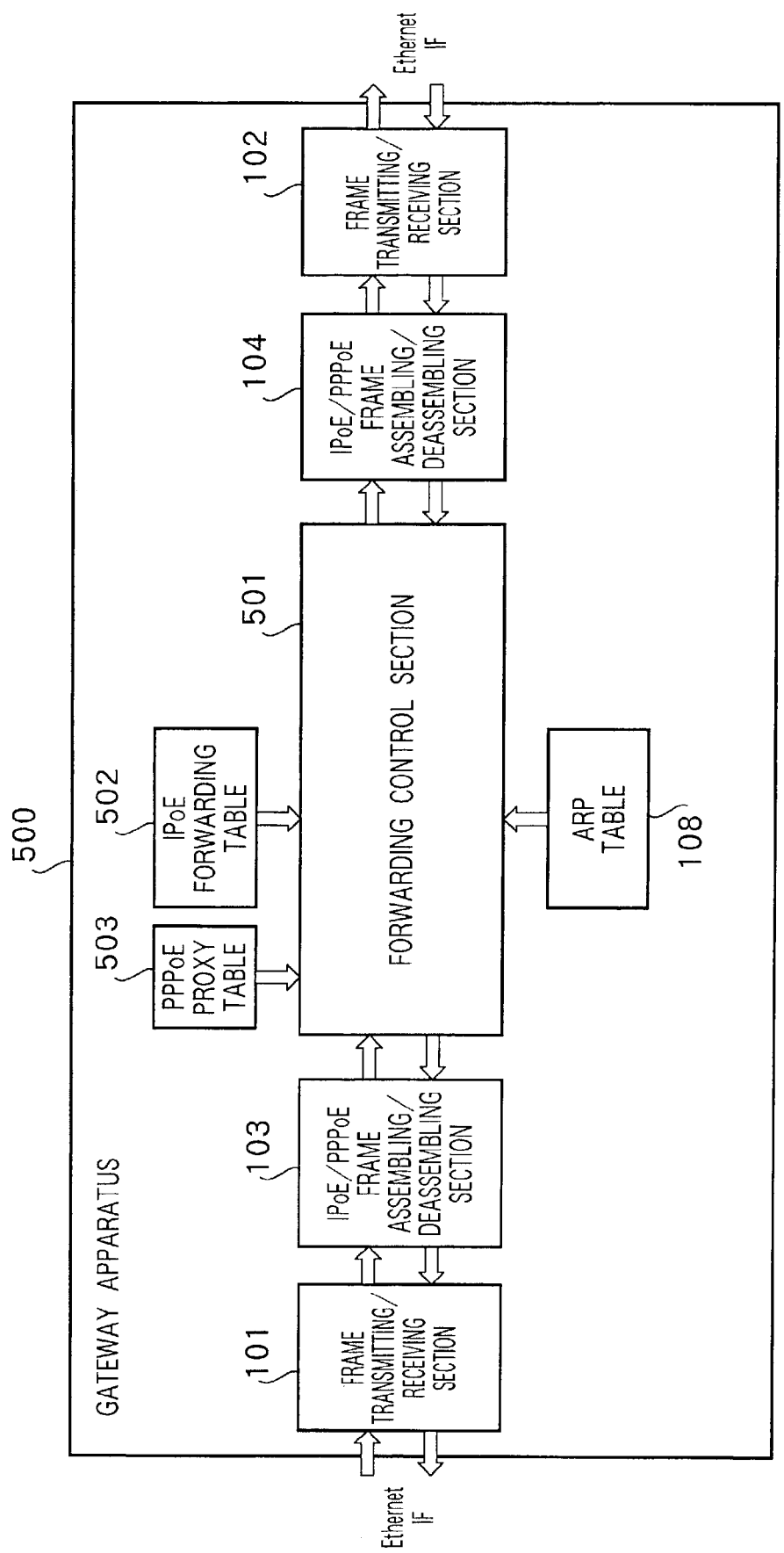
FIG. 13 is a diagram illustrating a configuration of a gateway apparatus according to a second embodiment of the present invention.
Figure 14:
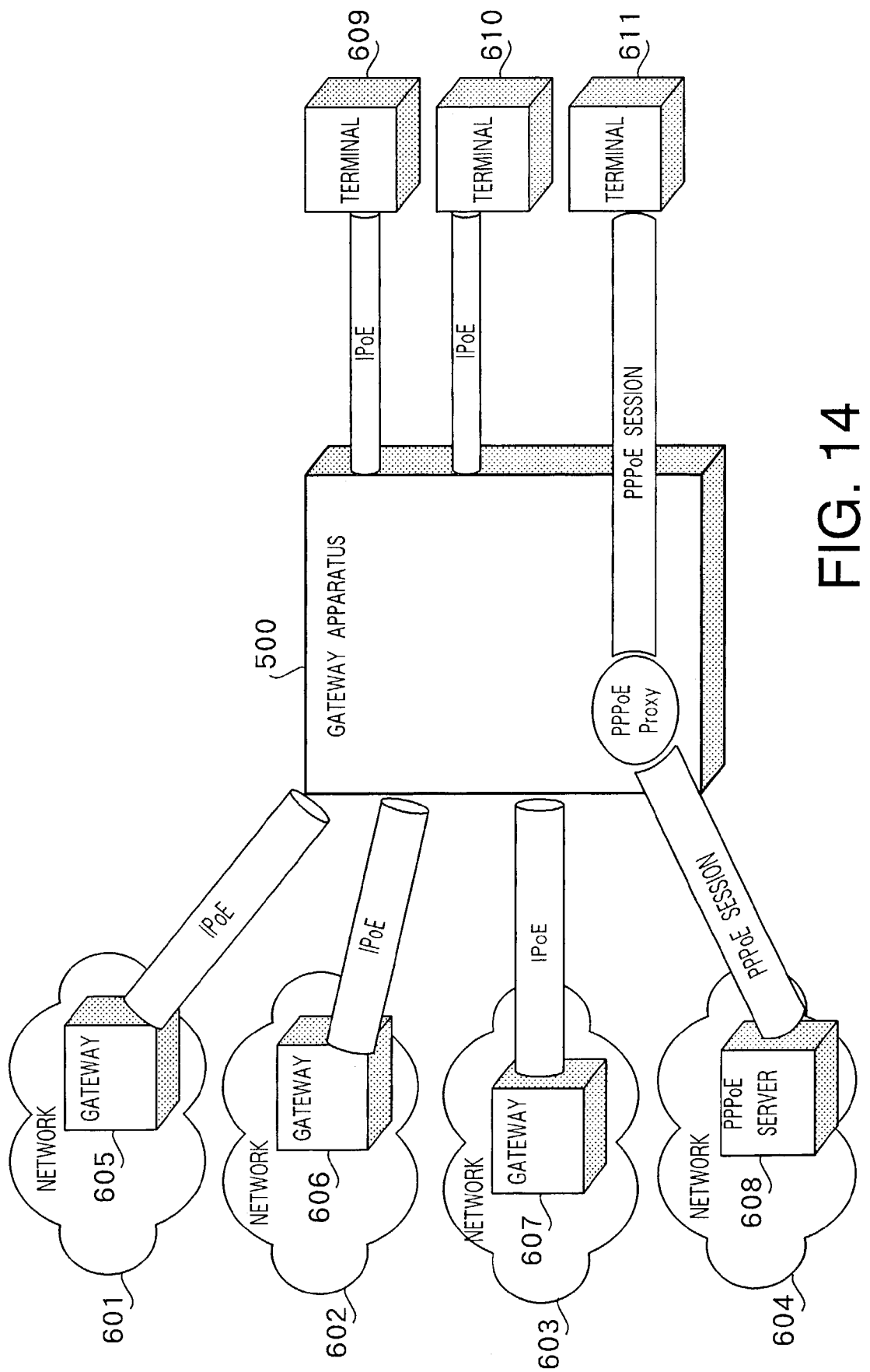
FIG. 14 is a diagram illustrating an example of network configuration to which the gateway apparatus according to the second embodiment is connected.

FIG. 13 is a diagram illustrating a configuration of gateway apparatus 500 according to the second embodiment of the present invention. FIG. 14 is a diagram illustrating an example of network configuration to which gateway apparatus 500 according to the second embodiment is connected. In addition, in FIG. 13, sections assigned the same reference numerals as in FIG. 9 have the same functions, and descriptions thereof are omitted.

As shown in FIG. 14, gateway apparatus 500 is connected in its one interface to networks 601 to 603 that use IPoE as a protocol and network 604 that uses PPPoE as a protocol. Gateway apparatus 500 communicates with gateways 605 to 607 respectively disposed on networks 601 to 603 and PPPoE server 608 disposed on network 604. Gateway apparatus 500 is further connected in its other interface to terminals 609 and 610 such as PCs that use IPoE as a protocol and terminal 611 such as a PC that uses PPPoE as a protocol.

In gateway apparatus 500 shown in FIG. 13, forwarding control section 501 controls the output of IPoE or PPPoE frame based on a destination IP address included in the header information of an IP packet of an input IPoE frame, while controlling the output of IPoE or PPPoE frame based on PPPoE header information of an input PPPoE frame. In controlling the output of IPoE or PPPoE frame, forwarding control section 501 uses IPoE forwarding table 502, ARP table 108 and PPPoE proxy table 503.

In addition, IPoE forwarding table 502 includes the same information as described in FIG. 3 mentioned previously, and descriptions thereof are omitted.

In PPPoE proxy table 503, as shown in FIG. 15, there are input IF numbers, source MAC addresses ①, destination MAC addresses ①, PPPoE session IDs ①, output IF numbers, source MAC addresses ②, destination MAC addresses ② and PPPoE session IDs ② in relation to one another.

In addition, in source MAC addresses ① and destination MAC addresses ②, since the MAC address of gateway apparatus 500 is generally used, all the entries have the same value. Accordingly, it may be possible to provide the MAC address of gateway apparatus 500 as a separate register, instead of providing areas for destination MAC addresses ① on input side and destination MAC addresses ② on outing side in PPPoE proxy table 503.

The operation of gateway apparatus 500 with the above configuration will be described below. Herein, cases are explained separately where an IPoE frame is input to frame transmitting/receiving section 101 and where a PPPoE frame is input to the section 101.

When either frame is input to frame transmitting/receiving section 101, IPoE/PPPoE frame assembling/deassembling section 103 recognizes a structure of the frame, and provides the recognized structure of the frame to forwarding control section 501.

When the input frame is an IPoE frame, forwarding control section 501 compares a destination IP address included in the header information of an IP packet of the IPoE frame with a network address registered with IPoE forwarding table 502.

When the table 502 has the same network address as the destination IP address included in the header information, the section 501 retrieves an output IF number and information of routing type (information indicative of whether the routing is direct routing or indirect routing) in relation to the network address, and when the indirect routing is indicated, further retrieves a destination IP address (next hop IP address). In addition, when the direct routing is indicated, the section 501 retrieves the destination IP address included in the header information of the IP packet.

Then, forwarding control section 501 searches ARP table 108 using the retrieved destination IP address to retrieve a destination MAC address. The retrieved destination MAC address is provided to IPoE/PPPoE frame assembling/deassembling section 104.

Using the destination MAC address, IPoE/PPPoE frame assembling/deassembling section 104 re-assembles the IPoE frame. The re-assembled IPoE frame is provided to frame transmitting/receiving section 102 and output from the section 102.

Meanwhile, when the input frame is a PPPoE frame, forwarding control section 501 compares PPPoE header information of the PPPoE frame with an entry in PPPoE proxy table 503.

When PPPoE header information of the PPPoE frame is matched with an entry registered with PPPoE proxy table 503, the section 501 retrieves information to generate a PPPoE frame such as an output IF number, source MAC address, destination MAC address and PPPoE session ID from PPPoE proxy table 503. The retrieval results are provided to IPoE/PPPoE frame assembling/deassembling section 104.

Based on the retrieval results, IPoE/PPPoE frame assembling/deassembling section 104 re-assembles the PPPoE frame. The re-assembled PPPoE frame is provided to frame transmitting/receiving section 102 and output from the section 102.

Thus, according to gateway apparatus 500 of the second embodiment, an IPoE frame is forwarded corresponding to a network address in relation to the destination IP address included in the header information of the input IPoE frame. Meanwhile, an input PPPoE frame is relayed to a network that uses PPPoE as a protocol, corresponding to the information registered with PPPoE proxy table 503. Therefore, even in a network using IPoE principally as a protocol, it is possible to flexibly cope with access to a network that uses PPPoE, corresponding to selection of protocol from a terminal.

Third Embodiment

Figure 16:
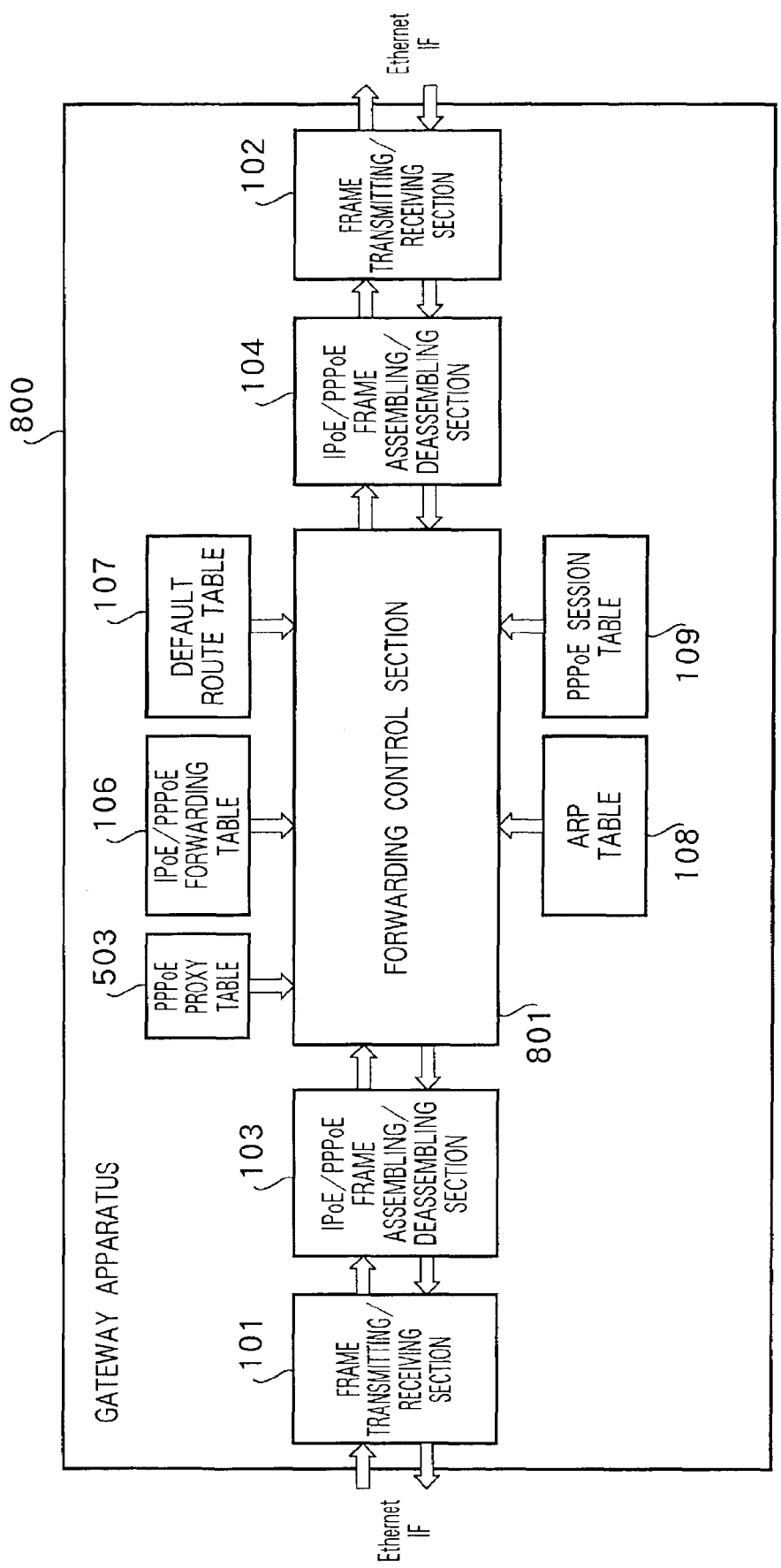
FIG. 16 is a diagram illustrating a configuration of a gateway apparatus according to a third embodiment of the present invention.
Figure 17:
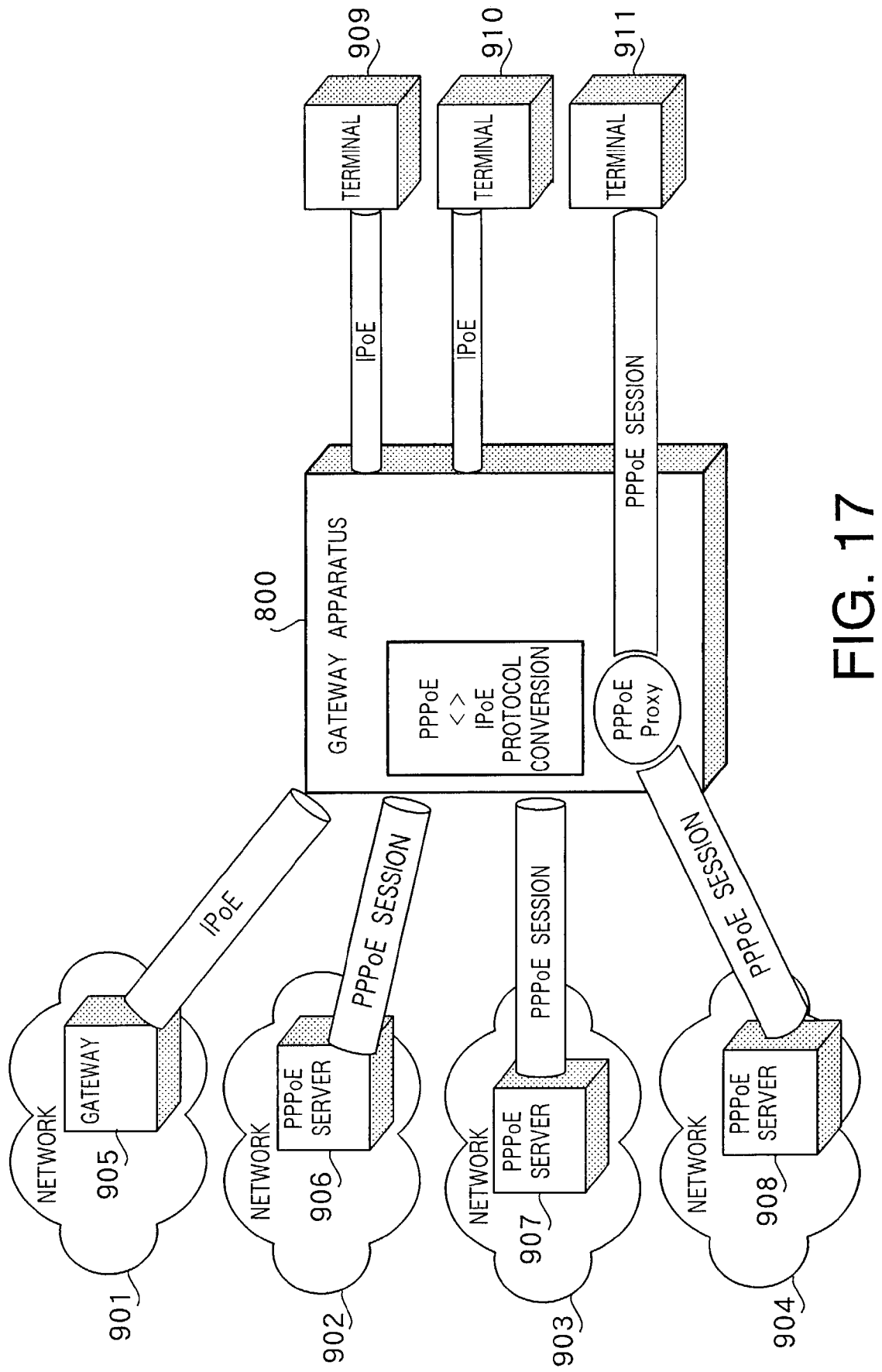
FIG. 17 is a diagram illustrating an example of network configuration to which the gateway apparatus according to the third embodiment is connected.

Gateway apparatus 800 according to the third embodiment has both functions of the first and second embodiments. FIG. 16 is a diagram illustrating a configuration of gateway apparatus 800 according to the third embodiment of the present invention. FIG. 17 is a diagram illustrating an example of network configuration to which gateway apparatus 800 according to the third embodiment is connected. In addition, in FIG. 16, sections assigned the same reference numerals as in FIGS. 9 and 13 have the same functions, and descriptions thereof are omitted.

As shown in FIG. 17, gateway apparatus 800 is connected in its one interface to network 901 that uses IPoE as a protocol and networks 902 to 904 that use PPPoE as a protocol. Gateway apparatus 800 communicates with gateway 905 disposed on network 901 and PPPoE servers 906 to 908 disposed respectively on networks 902 to 904. Gateway apparatus 800 is further connected in its other interface to terminals 909 and 910 such as PCs that use IPoE as a protocol and terminal 911 such as a PC that uses PPPoE as a protocol.

In gateway apparatus 800 shown in FIG. 16, forwarding control section 801 controls the output of IPoE or PPPoE frame based on a source IP address or destination IP address included in the header information of an IP packet of an input IPoE frame, while controlling the output of IPoE or PPPoE frame based on PPPoE header information of an input PPPoE frame. In controlling the output of IPoE or PPPoE frame, forwarding control section 801 uses IPoE/PPPoE forwarding table 106, default route table 107, ARP table 108, PPPoE session table 109 and PPPoE proxy table 503.

The operation of gateway apparatus 800 with the above configuration will be described below. Herein, cases are explained separately where an IPoE frame is input to frame transmitting/receiving section 101 and where a PPPoE frame is input to the section 101.

When either frame is input to frame transmitting/receiving section 101, IPoE/PPPoE frame assembling/deassembling section 103 recognizes a structure of the frame, and provides the recognized structure of the frame to forwarding control section 801.

When the input frame is an IPoE frame, forwarding control section 801 compares a destination IP address included in the header information of an IP packet of the PPPoE frame with a network address registered with IPoE/PPPoE forwarding table 106.

When the table 106 has the same network address as the destination IP address included in the header information, the section 801 retrieves an output IF number and a protocol type (PPPoE or IPoE) used in outputting in relation to the network address. When the retrieved protocol type is IPoE, the section 801 retrieves a routing type (direct routing or indirect routing), and in the case of the indirect routing, further retrieves a destination IP address (next hop IP address). In addition, in the case of the direct routing, the section 801 retrieves the destination IP address included in the header information of the IP packet. Meanwhile, when the retrieved protocol type is PPPoE, the section 801 retrieves a PPPoE session index.

When the retrieved protocol type is IPoE, forwarding control section 801 searches ARP table 108 using the retrieved destination IP address to retrieve a destination MAC address. The retrieved destination MAC address is provided to IPoE/PPPoE frame assembling/deassembling section 104.

Using the destination MAC address, IPoE/PPPoE frame assembling/deassembling section 104 re-assembles the IPoE frame. The re-assembled IPoE frame is provided to frame transmitting/receiving section 102, and output from the section 102.

Meanwhile, when the retrieved protocol type is PPPoE, the section 801 searches PPPoE session table 109 using the PPPoE session index, and retrieves information to generate a PPPoE frame such as a source MAC address, destination MAC address and PPPoE session ID. The retrieval results are provided to IPoE/PPPoE frame assembling/deassembling section 104.

Based on the retrieval results, IPoE/PPPoE frame assembling/deassembling section 104 re-assembles the IPoE frame into a PPPoE frame. The re-assembled PPPoE frame is provided to frame transmitting/receiving section 102 and output from the section 102.

Meanwhile, when the input frame is a PPPoE frame, forwarding control section 801 compares PPPoE header information of the PPPoE frame with an entry in PPPoE proxy table 503.

When PPPoE header information of the PPPoE frame is matched with an entry registered with PPPoE proxy table 503, the section 801 retrieves information to generate a PPPoE frame such as an output IF number, source MAC address, destination MAC address and PPPoE session ID from PPPoE proxy table 503. The retrieval results are provided to IPoE/PPPoE frame assembling/deassembling section 104.

Based on the retrieval results, IPoE/PPPoE frame assembling/deassembling section 104 re-assembles the PPPoE frame. The re-assembled PPPoE frame is provided to frame transmitting/receiving section 102 and output from the section 102.

Meanwhile, When PPPoE header information of the PPPoE frame is not matched with an entry registered with PPPoE proxy table 503, forwarding control section 801 compares PPPoE header information of a PPPoE frame with an entry in PPPoE session table 109.

When PPPoE header information of the PPPoE frame is matched with an entry registered with PPPoE session table 109, forwarding control section 801 compares a destination IP address included in the header information of an IP packet of the PPPoE frame with a network address registered with IPoE/PPPoE forwarding table 106.

When the table 106 has the same network address as the destination IP address included in the header information, the section 801 retrieves an output IF number and a protocol type (PPPoE or IPoE) used in outputting in relation to the network address. When the retrieved protocol type is IPoE, the section 801 retrieves a routing type (direct routing or indirect routing), and in the case of the indirect routing, further retrieves a destination IP address (next hop IP address). In addition, in the case of the direct routing, the section 801 retrieves the destination IP address included in the header information of the IP packet. Meanwhile, when the retrieved protocol type is PPPoE, the section 801 retrieves a PPPoE session index.

When the retrieved protocol type is IPoE, forwarding control section 801 searches ARP table 108 using the retrieved destination IP address to retrieve a destination MAC address. The retrieved destination MAC address is provided to IPoE/PPPoE frame assembling/deassembling section 104.

Using the destination MAC address, IPoE/PPPoE frame assembling/deassembling section 104 re-assembles the PPPoE frame to an IPoE frame. The re-assembled IPoE frame is provided to frame transmitting/receiving section 102, and output from the section 102.

Meanwhile, when the retrieved protocol type is PPPoE, the section 801 searches PPPoE session table 109 using the PPPoE session index, and retrieves information to generate a PPPoE frame such as a source MAC address, destination MAC address and PPPoE session ID. The retrieval results are provided to IPoE/PPPoE frame assembling/deassembling section 104.

Based on the retrieval results, IPoE/PPPoE frame assembling/deassembling section 104 re-assembles the PPPoE frame. The re-assembled PPPoE frame is provided to frame transmitting/receiving section 102 and output from the section 102.

Thus, according to gateway apparatus 800 of the third embodiment, forwarding control section 801 selects a type of protocol (IPoE or PPPoE) used in outputting corresponding to a network address in relation to a destination IP address included in the header information of an input frame, and when the type of protocol is PPPoE, further selects a PPPoE session. Accordingly, the apparatus 800 is capable of using a protocol between IPoE and PPPoE appropriately corresponding to a network as a destination of the input frame, and of choosing a PPPoE session appropriately when the protocol is PPPoE.

Further, according to gateway apparatus 800 according to the third embodiment, an input PPPoE frame is relayed to a network that uses PPPoE as a protocol, corresponding to the information registered with PPPoE proxy table 503. Therefore, even in a network using IPoE principally as a protocol, it is possible to flexibly cope with access to a network that uses PPPoE, corresponding to selection of protocol from a terminal.

In addition, in searching IPoE/PPPoE forwarding table 106, when a network address matches a network address that is not designated particularly, i.e., an entry of default route, forwarding control section 801 searches default route table 107, using a source IP address of an IP packet.

When the same source IP address is registered, forwarding control section 801 substitutes a retrieval result of default route table 107 for a retrieval result of IPoE/PPPoE forwarding table 106 to use.

In other words, corresponding to source IP address, forwarding control section 801 selects a type of protocol (IPoE or PPPoE) used in outputting, and when the protocol type is PPPoE, further selects a PPPoE session. Accordingly, even when a general network address is not retrieved, the section 801 is capable of identifying a terminal corresponding to the source IP address, selecting a type of protocol (IPoE or PPPoE) to use for each terminal, and when the protocol type is PPPoE, further selecting a PPPoE session. Therefore, provided with a user of a terminal beforehand registers information of a desired ISP (Internet Service Provider), the apparatus is capable of using ISP appropriately for each terminal even in the case where a general network address is not retrieved.

In addition, it is possible to apply gateway apparatus 100 (500, 800) to a network using local IP addresses and global IP addresses appropriately. In this case, the gateway apparatus is provided with an address conversion table as shown in FIG. 18, and performs mutual address conversion between local IP address and global IP address to implement.

Further, as is apparent to those skilled in the art, the present invention is capable of being carried into practice using a commercially available general digital computer and micro processor with a program created according techniques as described in the aforementioned embodiments. Furthermore, as is apparent to those skilled in the art, the present invention includes computer programs created by those skilled in the art based on techniques as described in the aforementioned embodiments.

Moreover, the present invention includes in its scope computer program products that are storage media including orders for use in programming of computers to implement the present invention. The storage media include, for example but not limited, disks such as a floppy disk (R), optical disk, CDROM and magnetic disk, ROM, RAM, EPROM, EEPROM, magnetic optical disk, memory card and DVD.

As described above, according to the gateway apparatus and its controlling method, terminals connected to the apparatus are capable of selecting a protocol to use between PPPoE and IPoE, and of selecting a plurality of PPPoE sessions concurrently.

The present invention is not limited to the above described embodiments, and various variations and modifications may be possible without departing from the scope of the present invention.

This application is based on the Japanese Patent Application No. 2002-032813 filed on Feb. 8, 2002, entire content of which is expressly incorporated by reference herein.

What is claimed is:

1. A gateway apparatus comprising:
an IPoE forwarding table in which network addresses and destination IP addresses are registered;
a PPPoE proxy table in which source MAC addresses and PPPoE session IDs on input side and destination MAC addresses and PPPoE session IDs on output side are registered;
an ARP table in which destination IP addresses and destination MAC addresses are registered; and
a control section that controls output of an input frame using the IPoE forwarding table, the PPPoE proxy table and the ARP table, wherein:
when a PPPoE frame is input and an entry that matches header information of the PPPoE frame is registered in the PPPoE proxy table, the control section controls output of the PPPoE frame based on a destination MAC address and a PPPoE session ID on the output side registered in the entry; and
when an IPoE frame is input, the control section selects a destination IP address in association with a network address in the IPoE forwarding table that matches another destination IP address included in header information of an IP packet of the IPoE frame, and controls output of the IPoE frame based on the destination IP address or a destination MAC address in the ARP table in association with the another destination IP address included in the header information.

2. A control method of a gateway apparatus which comprises an IPoE forwarding table in which network addresses and destination IP addresses are registered, a PPPoE proxy table in which source MAC addresses and PPPoE session IDs on input side and destination MAC addresses and PPPoE session IDs on output side are registered, and an ARP table in which destination IP addresses and destination MAC addresses are registered, the control method comprising:
when a PPPoE frame is input and an entry that matches header information of the PPPoE frame is registered in the PPPoE proxy table, controlling output of the PPPoE frame based on a destination MAC address and a PPPoE session ID on the output side registered in the entry; and,
when an IPoE frame is input,
selecting a destination IP address in association with a network address in the IPoE forwarding table that matches another destination IP address included in header information of an IP packet of the IPoE frame and controlling output of the IPoE frame based on the destination IP address or a destination MAC address in the ARP table in association with the another destination IP address included in the header information.

3. A gateway apparatus comprising:
an IPoE/PPPoE forwarding table in which network addresses, protocol types, destination IP addresses used in IPoE and retrieval indexes of PPPoE sessions used in PPPoE are registered;
a PPPoE session table in which the retrieval indexes, destination MAC addresses and PPPoE session IDs are registered;
an ARP table in which destination IP addresses and destination MAC addresses are registered; and
a default route table in which source IP addresses, protocol types, destination IP addresses used in IPoE and retrieval indexes of PPPoE sessions used in PPPoE are registered; and
a control section that controls output of an input frame using information registered in the IPoE/PPPoE forwarding table, the PPPoE session table, and the ARP table and the default route table, wherein:
the control section selects a protocol type according to a network address in the IPoE/PPPoE forwarding table that matches a destination IP address included in header information of an IP packet of the input frame;
when the protocol type selected is IPoE, the control section controls output of an IPoE frame based on a destination IP address corresponding to the network address or a destination MAC address in the ARP table in association with the destination IP address included in the header information;
when the protocol type selected is PPPoE, the control section controls output of a PPPoE frame based on a destination MAC address and a PPPoE session ID in the PPPoE session table in association with a retrieval index corresponding to the network address;
when the destination IP address matches a network address registered as a default route in the IPoE/PPPoE forwarding table, the control section selects a protocol type according to a source IP address in the default route table that matches a source IP address included in the header information;
when the protocol type selected is IPoE, the control section controls output of the IPoE frame based on a destination IP address corresponding to the source IP address or a destination MAC address in the ARP table in association with the destination IP address included in the header information; and when the protocol type selected is PPPoE, the control section controls output of the PPPoE frame based on a destination MAC address and a PPPoE session ID in the PPPoE session table in association with a retrieval index corresponding to the source IP address.

4. The gateway apparatus according to claim 3, further comprising:

a PPPoE proxy table in which source MAC addresses and PPPoE session IDs on input side and destination MAC addresses and PPPoE session IDs on output side are registered; wherein:

when a PPPoE frame is input and an entry that matches header information of the PPPoE frame is registered in the PPPoE proxy table, the control section controls output of the PPPoE frame based on a destination MAC address and a PPPoE session ID on the output side registered in the entry; and, when a PPPoE frame is input, and an entry that matches header information of the PPPoE frame is not registered in the PPPoE proxy table, and, when the an entry that matches the header information of the PPPoE frame is registered in the PPPoE session table, the control section compares a destination IP address included in the header information of an IP packet of the PPPoE frame with each of the network addresses in the IPoE/PPPoE forwarding table.

5. A control method of a gateway apparatus which comprises an IPoE/PPPoE forwarding table in which network addresses, protocol types, destination IP addresses used in IPoE and retrieval indexes of PPPoE sessions used in PPPoE are registered, a PPPoE session table in which the retrieval indexes, destination MAC addresses and PPPoE session IDs are registered, an ARP table in which destination IP addresses and destination MAC addresses are registered, and a default route table in which source IP addresses, protocol types, destination IP addresses used in IPoE and retrieval indexes of PPPoE sessions used in PPPoE are registered, the control method comprising:

selecting a protocol type according to a network address in the IPoE/PPPoE forwarding table that matches a destination IP address included in header information of an IP packet of an input frame;

when the protocol type selected is IPoE, controlling output of an IPoE frame based on a destination IP address corresponding to the network address or a destination MAC address in the ARP table in association with the destination IP address included in the header information;

when the protocol type selected is PPPoE, controlling output of a PPPoE frame based on a destination MAC address and a PPPoE session ID in the PPPoE session table in association with a retrieval index corresponding to the network address;

when the destination IP address matches a network address registered as a default route in the IPoE/PPPoE forwarding table, selecting a protocol type according to a source IP address in the default route table that matches a source IP address included in header information;

when the protocol type selected is IPoE, controlling output of an IPoE based on a destination IP address corresponding to the source IP address or a destination MAC address in the ARP table in association with the destination IP address included in the header information; and when the protocol type selected is PPPoE, controlling output of a PPPoE frame based on a destination MAC address and a PPPoE session ID in the PPPoE session table in association with a retrieval index corresponding to the source IP address.

6. The control method of the gateway apparatus according to claim 5, wherein:

the gateway apparatus further comprises a PPPoE proxy table in which source MAC addresses and PPPoE session IDs on input side and destination MAC addresses and PPPoE session IDs on output side are registered;

when a PPPoE frame is input and an entry that matches header information of the PPPoE frame is registered in the PPPoE proxy table, output of the PPPoE frame is controlled based on a destination MAC address and a PPPoE session ID on the output side registered in the entry; and when the PPPoE frame is input, and the entry that matches the header information of the PPPoE frame is not registered in the PPPoE proxy table, and, when the entry that matches the header information of the PPPoE frame is registered in the PPPoE session table, a destination IP address included in the header information of an IP packet of the PPPoE frame is compared with each of the network addresses in the IPoE/PPPoE forwarding table.

* * * * *